United States Patent Office 3,523,064
Patented Aug. 4, 1970

3,523,064
PROTEIN CONCENTRATES FROM CYCLOHEXANE OXIDATION BY-PRODUCTS
Wolfgang Griehl, Chur, Grisons, and Christine Suter-Homuth, Domat-Ems, Grisons, Switzerland, assignors to Inventa A.G. für Forschung und Patentverwertung, Zurich, Switzerland
No Drawing. Filed Aug. 29, 1967, Ser. No. 663,990
Claims priority, application Switzerland, Aug. 31, 1966, 12,630/66
Int. Cl. C12b 1/00
U.S. Cl. 195—28                                    13 Claims

ABSTRACT OF THE DISCLOSURE

A process for the production of cellular protein from the waste liquors obtained in the cyclohexane oxidation. Microorganisms of the family of Pseudomonadaceae convert these waste products to proteins in alkaline medium at ambient temperatures at 24°–30° C. and pH levels of substantially 6.7 to 9.2 within 50 to 90 hours. The process has the twofold advantage of manufacturing a useful product from wastes and to prevent water pollution.

---

The invention relates to a process for the manufacture of protein concentrates from the waste products of the cyclohexane oxidation and to a utilization of these wastes. In the cyclohexane oxidation to cyclohexanone with oxygen-containing gases, secondary oxidation products form which are present as acid materials in the waste liquor during the separating and refining steps following oxidation. Working off of these by-products and their removal has presented grave problems to the industry.

It has been attempted in the past to make use of these waste liquors by separating them into their components, esterification, hydrogenation, solvent extraction, conversion of lactones into lactams, etc. However, the results have been most unsatisfactory. Even burning of the wastes is impractical because it is very expensive. The unconverted products cannot be dumped into rivers or lakes because of the ensuing pollution, so that some disposal is necessary.

It is known that industrial wastes may be converted biologically into feed proteins. Molasses, beech wood sulfite liquors and coniferous wood liquors can yield protein microbiologically with yeast or other microorganisms. The latter also selectively convert linear paraffin hydrocarbons (Belgian Pat. 641,990). Waste liquors of the paraffin oxidation are degraded by yeast (M. Thonke, Freiberger Forschungsheffe, A 170, 90 (1960)).

Investigation of the cyclohexane oxidation wastes has shown that the same generally inhibit microorganism growth, also inhibit breathing of the cells and acceptance of nutrients, thus causing the cells to die. These wastes act particularly bactericidally and propagation-inhibiting on strains of the families of Micrococcaceae, Lactobacteriaceae, Enterobacteriaceae, Bacillaceae, yeast and other microorganisms, such as *Micrococcus Cohn*, *Streptococcus agalactiae*, Staphylococcus, *Lactobacillus lactis*, *Propionibacterium Shermanii*, *Escherichia coli*, *Aerobacter aerogenes*, *Bacillus sphaericus*, *Saccharomyces cerevisiae*.

Surprisingly and unexpectedly, it has been found that microorganisms of the family of Pseudomonadaceae multiply on the wastes from the cyclohexane oxidation and build cellular protein therefrom. The conversion of the cyclohexane oxidation wastes into bacterial protein is novel and, to date, is their sole useful application. This conversion advantageously is carried out with *Pseudomonas fluorescens* (Bergey's Manual of Determinative Bacteriology, 6th edn., 1950), but not limited thereto.

In order to convert the organic waste products, i.e., the cyclohexane oxidation by-products, into protein, present in alkaline solution, they are subjected to fermentation, either in the form as originally obtained or after acidulation, e.g., with sulfuric acid, and separation therefrom as upper and lower layers, respectively, or else after extraction with cyclohexane and ensuing distillation. It also is feasible to totally extract, e.g., with methylethylketone, from the lower layer after acidulation, all organic acids present. The wastes usually are employed in concentrations ranging from 0.2 to 50 weight percent, calculated on the nutrient medium. Nitrogen sources for the fermentation are ammonium compounds such as ammonium hydroxide, -sulfate, -chloride, -carbonate, -acetate, diammonium hydrogen phosphate, sodium ammonium hydrogen phosphate, also nitrates such as potassium nitrate, or organic nitrogenous compounds, e.g., urea. Especially good sources are protein-like nitrogen compounds.

It is opportune to incorporate inorganic compounds, e.g., iron sulfate, magnesium sulfate, magnesium chloride, sodium chloride, dipotassium hydrogen phosphate or cobalt compounds.

Fermentation is carried out under areobic conditions, e.g., as culture in a shaking flask or as submerged culture in fermentation vessels, also in deep tanks with aerating and agitating devices. Fermentation can be carried out continuously or batchwise. For aeration, air, oxygen or a mixture thereof in proportions of 1 volume gas per volume reaction mixture per minute have been found particularly suitable.

Agitation is of advantage, and the most suitable agitator speed is 230–1200 r.p.m. The temperatures usually are 24–30° C., preferably 25°. The pH during fermentation should not exceed 6.7 in acid range and 9.2 in the alkaline range, and preferably is held between 7.0 and 8.0. Suitable neutralizing or buffering agents are amonium hydroxide, hydrochloric acid, sulfuric acid, and others.

It is necessary to incorporate antifoaming agents during the entire reaction time, such as sperm oil, lard oil, or silicone oil.

The maximum amount of cells is attained within 50 to 90 hours. After completion of the fermentation, culture medium and cells are separated, e.g., by centrifugation. The cells are dried in the conventional manner, e.g., air- or heat-dried, sprayed or deposited on steam cylinders. They then are high-quality protein concentrates containing essential amino acids and are useful in the feeding of animals or as additives of foodstuffs.

The dry cell substances also can be acid digested, e.g., with 6 N HCl, and the amino acids thus obtained isolated by means of strongly acidic ion exchangers, such as Dowex 50 WX 8 (reg. trademark).

The filtrate remaining after separation of the cells is treated with a strongly acidic ion exchanger. The amino acids, formed extracellularly and adsorbed by the exchangers can be isolated therefrom.

The invention now will be more fully explained by the following examples. However, it should be understood that these are given merely by way of illustration, and not of limitation, and that it is intended to cover all modifications and variations which do not constitute a departure from the spirit and the scope of the invention as hereinafter claimed.

All percentages and proportions are by weight unless otherwise specified, temperatures are in degrees centigrade.

EXAMPLE 1

*Pseudomonas fluorescens* was shaken at 25° for 48 hours in a wide-neck Erlenmeyer flask with a culture medium as described below. The medium previously had been sterilized for 30 minutes at a pressure of 0.7 kg./cm.² at 110°, and consisted of an aqueous solution containing:

| | Percent |
|---|---|
| $FeSO_4 \times 7H_2O$ | 0.01 |
| $MgCl_2 \times 6H_2O$ | 0.04 |
| $MgSO_4 \times 7H_2O$ | 0.05 |
| $NaNH_4HPO_4 \times 4H_2O$ | 0.35 |
| $K_2HPO_4$ anh. | 1.00 |
| Mixed monocarboxylic acids ($C_4$–$C_6$ in proportions of 1:8:3) | 0.20 |

The pH of the nutrient solution was 7.0.

A nutrient medium, sterilized as described above, was seeded with this culture medium in the proportion of one part of seed culture to each 10 parts of nutrient medium. The nutrient medium had the following composition:

| | Percent |
|---|---|
| $MgSO_4 \times 7H_2O$ | 0.05 |
| $K_2HPO_4$ anh. | 1.00 |
| $NaNH_4HPO_4 \times 4H_2O$ | 2.00 |
| NaCl | 0.05 |
| Water | Balance |

The wastes of the cyclohexane oxidation, in the form described above as the lower layer after acidulation, i.e., an aqueous solution of the sodium salts of dicarboxylic acids, succinic and glutaric acid, monocarboxylic acids, formic, butyric, valeric and caproic acid, and free NaOH, were adjusted to a pH of 7 with 10% $H_2SO_4$ in proportions of 1:2, calculated on the combined media, and were added to the combined media. Conversion into bacterial protein was carried out at 25° with agitation of 450 r.p.m. and aeration with ½ volume air and ½ volume $O_2$ per volume reaction mixture per minute. The pH value, tending to rise, was held at 7.5 by addition of 10% $H_2SO_4$. Silicone oil was added as required.

The "lower layer" solution was dropped in continuously, and the reaction mixture, after 70 hours, had a microorganism propagation factor of 100–120.

Upon conversion of the waste into bacterial dry substance, 100 parts carbon compounds yielded 50 parts dry bacterial substance having a protein proportion of 50%.

The fermentation solution, after 70 hours, was centrifuged at 4,500 r.p.m. After air drying at room temperature, the cellular sediment then was post-dried to constant weight at 60–65°. When the intracellular amino acids were to be isolated and identified, they were acid digested and adsorbed on ion exchangers in the conventional manner and identified chromatographically.

The amino acids formed extracellularly, remaining after centrifugation, were isolated and refined in the same manner. The products identified above as waste products of the cyclohexane oxidation were obtained by the oxidation of cyclohexane with air in the liquid phase at elevated temperatures and pressures in the presence of a heavy metal catalyst. Aside from cyclohexanone and cyclohexanol, the oxidation yields as by-products carboxylic acids which are present in the oxidation product as free acids, as cyclohexanol esters or as lactones. The separation of these acids or their derivatives, respectively, was carried out in a saponification or hydrolysis following oxidation by means of dilute NaOH at elevated temperatures and pressures. The acids also could be separated from the oxidation solution by a water- or dilute alkali-wash, e.g., with alkali hydroxide or -carbonate solutions. The cyclohexane oxidation by-products then were in the alkaline solution, the so-called "waste liquor." The same then was acidulated with dilute sulfuric acid, and the lower layer formed thereby, subjected to fermentation.

EXAMPLE 2

*Pseudomonas fluorescens* was cultivated in the medium named in Example 1 and with 0.1% glucose and 0.2% butyric acid in lieu of the monocarboxylic acid mixture for 24 hours under otherwise like conditions.

A fermentation medium then was seeded as in Example 1, having the following composition:

| | Percent |
|---|---|
| $FeSO_4 \times 7H_2O$ | 0.01 |
| $MgCl_2 \times 6H_2O$ | 0.04 |
| Peptone | 2.00 |
| $K_2HPO_4$ anh. | 1.00 |
| Water | Balance |

The upper layer obtained by acidulation of the cyclohexane wastes with sulfuric acid, consisting essentially of the organic acids named in Example 1, was added within 1–3 hours in 0.8% concentration, calculated on the total volume, depending on the dwelling time of the substrate.

The cells increased by 80–100 times within 90 hours and contained 50% protein in the dry substance at 26°, a pH of 7.2, agitation at 650 r.p.m. and aeration with 1 volume air per volume reaction mixture per minute. An antifoam was added as required and could consist of silicone oil, lard oil or sperm oil. 100.0 g. carbon compound introduced and consumed yielded 40.0 g. dry cell substance.

EXAMPLE 3

*Pseudomonas fluorescens* was cultivated in the medium described in Example 1 which contained 0.5% dextrose in lieu of 0.2% monocarboxylic acids, in a shaking flask at 120 r.p.m. and transferred, after 36 hours, to a fermentation mixture consisting of:

| | Percent |
|---|---|
| $FeSO_4 \times 7H_2O$ | 0.01 |
| $MgCl_2 \times 6H_2O$ | 0.04 |
| $MgSO_4 \times 7H_2O$ | 0.05 |
| $(NH_2)_2CO$ | 1.00 |
| $K_2HPO_4$ anh. | 1.00 |
| Water | Balance |

The mixture of all organic acids obtained from the cycohexane oxidation wastes as lower layer by total extraction with methylethylketone, was continuously dropped in as 0.6% aqueous solution within 64 hours. The pH of 8.0 was maintained by means of 10% $NH_4OH$ or 10% HCl during the entire reaction. The temperature was 24°, the agitator speed 280 r.p.m., the mixture aerated with 1 volume $O_2$ per volume reaction mixture per minute. A silicone oil was used as antifoam.

Constant results were obtained. $10^{-9}$ cells per ml. yielded a dry cell substance of 10.0 to 20.0 mg./ml., corresponding to a cyclohexane oxidation waste conversion of 1:2.5, calculated on the culture media, and to 100%, calculated on the available carbon.

Whereas, for the sake of convenience, *Pseudomonas fluorescens* has been used in the preceding examples, comparable results are obtainable with other members of the family of Pseudomonadaceae.

A typical analysis of the cyclohexane oxidation wastes is for example as follows:

(1) Composition of the lower layer:

(a) Components:

| | G./l. |
|---|---|
| Water | 867.5 |
| Free NaOH | 12.6 |
| $Na_2CO_3$ | 10.5 |
| Na salts of organic acids | 243.4 |

(b) Composition of the above named Na salts of organic acids:

| Na salt: | Weight percent |
|---|---|
| Na-butyrate | 4.2 |
| Na-valerate | 19.1 |
| Na-caproate | 6.1 |
| Na-succinate | 4.6 |
| Na-glutarate | 7.7 |
| Na-adipate | 17.5 |
| Na-oxycaproate | 25.6 |
| Na-salts of polymers of oxy- and oxo-acids | 15.2 |

(2) Composition of the upper layer:

(a) Components:

| | Weight percent |
|---|---|
| Analysed acids | 45.4 |
| Water | 30.0 |
| Unknown (acids, polymers) | 24.6 |

(b) Compositions of the above named analyzed acids:

| Acid: | Weight percent |
|---|---|
| Butyric acid | 4.9 |
| Valeric acid | 29.3 |
| Caproic acid | 10.9 |
| Succinic acid | 2.0 |
| Glutaric acid | 5.4 |
| Adipic acid | 19.6 |
| Oxycaproic acid | 26.9 |

We claim as our invention:

1. A process for the manufacture of protein from cyclohexane oxidation wastes which comprises the steps of aerobically fermenting said wastes in the presence of a nitrogen-yielding compound with a microorganism of the genus Pseudomonas and recovering Pseudomonas protein therefrom.

2. The process as defined in claim 1, wherein said microorganism is *Pseudomonas fluorescens*.

3. The process as defined in claim 1, wherein said wastes are fermented at a pH of substantially 6.7 to 9.2.

4. The process as defined in claim 3, wherein the pH is 7.0 to 8.0.

5. The process as defined in claim 1, wherein said wastes are fermented at a temperature of 24–30° C.

6. The process as defined in claim 5, wherein said temperature is 25° C.

7. The process as defined in claim 1, wherein said wastes are present in a concentration of 0.2 to 50 weight percent.

8. The process as defined in claim 1, wherein fermentation is carried out with a gas selected from the group consisting of air, oxygen, or mixtures thereof, in proportions of substantially 1 volume gas per volume fermentation mixture per minute.

9. The process as defined in claim 1, wherein fermentation is carried out with agitation, the agitator speed ranging from 230–1,200 r.p.m.

10. The process as defined in claim 1, wherein an antifoaming agent is added to the fermentation in an amount sufficient to suppress foaming, said agent being silicone oil, lard oil or sperm oil.

11. The process as defined in claim 1, wherein fermentation is completed within substantially 50 to 90 hours.

12. The process as defined in claim 1, wherein said nitrogen-yielding compound is selected from the group consisting of ammonium hydroxide, -sulfate, -chloride, -carbonate, -acetate, diammoniumhydrogenphosphate, sodiumammoniumhydrogenphosphate, sodium- and potassium-nitrate, and urea.

13. A process for the manufacture of protein from cyclohexane oxidation wastes which comprises the steps of aerobically fermenting said wastes at a temperature of 24–30° C. and at a pH of substantially 6.7 to 9.2 in the presence of a nitrogen-yielding compound with a microorganism of the genus Pseudomonas, said wastes being present in a concentration of 0.2 to 50 weight percent and recovering Pseudomonas protein therefrom.

References Cited

UNITED STATES PATENTS 3,355,296 11/1967 Perkins et al.

LIONEL M. SHAPIRO, Primary Examiner

GARY M. NATH, Assistant Examiner